United States Patent [19]
Black

[11] 3,839,668
[45] Oct. 1, 1974

[54] ELECTRONIC CONVERTER WITH REGULATED OUTPUT CURRENT AND FREQUENCY

[75] Inventor: David Harold Alexander Black, Tenaga, Quebec, Canada

[73] Assignee: Bell-Northern Research Ltd., Ottawa, Canada

[22] Filed: June 13, 1973

[21] Appl. No.: 369,475

[52] U.S. Cl. .................................. 321/21, 321/18
[51] Int. Cl. ............................................ H02m 7/00
[58] Field of Search ................................ 321/18, 21

[56] References Cited
UNITED STATES PATENTS

| | | |
|---|---|---|
| 3,327,199 | 6/1967 | Gardner et al. .................... 321/18 X |
| 3,336,521 | 8/1967 | Russell .................................. 321/18 |
| 3,369,195 | 2/1968 | Zollinger et al. ................. 321/18 X |
| 3,387,228 | 6/1968 | Randall ............................... 321/18 X |
| 3,500,168 | 3/1970 | Merritt ................................. 321/21 |
| 3,564,384 | 2/1971 | Adler .................................. 321/18 X |
| 3,737,755 | 6/1973 | Calkin et al. ...................... 321/21 X |
| 3,742,330 | 6/1973 | Hodges et al. ................. 321/45 R X |

*Primary Examiner*—William M. Shoop
*Attorney, Agent, or Firm*—John E. Mowle

[57] ABSTRACT

A constant current converter utilizing a free running inverter employing current feedback. The inverter output current is sampled and used to control a switching regulator synchronized to the inverter, so that the supply voltage fed to the inverter holds its output current and consequently its output frequency substantially constant.

6 Claims, 2 Drawing Figures

ELECTRONIC CONVERTER WITH REGULATED OUTPUT CURRENT AND FREQUENCY

This invention relates to a converter which provides a substantially constant current over widely varying load conditions and more particularly to one which may be used to provide dc, to dc, conversion for supplying power to long line transmission systems of varying length which utilize line repeater amplifiers.

BACKGROUND OF THE INVENTION

In telephone communications, considerable development has centered recently on cable transmission systems for inter-exchange and toll service. Typically, the cable comprises a number of separate transmission paths or pairs of conductors along which are located line repeater amplifiers at discrete intervals that are serially dc powered from one end of the system. Because of the varying number of repeater amplifiers which can be used in each leg, it has been found advantageous to power the transmission system from a constant current source. This will result in substantially the same voltage drop across each repeater amplifier.

In telephone systems however, primary power for the communications equipment is provided by batteries located at the terminals. Consequently, it is necessary to provide voltage to current converters. One system for achieving this utilizes a dc to dc switching converter which inverts the battery voltage into a series of square wave pulses which are then rectified and filtered to provide a constant current output to the transmission line. Current regulation is provided by a switching regulator connected in series with the inverter.

The majority of converters utilize push-pull inverters which have a pair of transistors driven by a small saturating driver transformer with the output being coupled from the transistors by a large non-saturating output transformer. Oscillations are maintained by voltage feedback which is picked off the output by the feedback transformer. With this arrangement, the inverter oscillates and provides a square wave output votlage at a frequency which is determined principally by the core characteristics of the drive transformer and the voltage applied across the inverter. To maintain a constant output current, the voltage applied to the inverter must vary with the load, i.e., the number of repeater amplifiers connected along the leg of the system. With widely differing loads, the frequency of the inverter will vary over an extended range.

One disadvantage of this arrangement is the dc output filter must be designed to handle the lowest anticipated frequency of the inverter. Still another disadvantage, which is encountered when the converter is used to power a transmission system, is the likelihood of spurious signals resulting from harmonics in the supply interfering with the transmission facilities. It is therefore advantageous to utilize an inverter in which the frequency remains substantially constant over the operating range.

STATEMENT OF THE INVENTION

It has been discovered that by providing a converter which has a free running inverter utilizing current feedback, the frequency can be maintained substantially constant over widely varying load conditions provided the load current is constant.

Thus, in accordance with the present invention there is provided a converter for generating a substantially constant current over widely varying load conditions comprising: a free-running inverter utilzing current feedback. In addition, a switching regulator, which is driven and controlled by the output of the free-running inverter is utilized to switch a supply voltage so that its duty cycle tends to maintain the inverter output current constant. The output of the switching regulator is then filtered to provide a variable dc supply voltage to the inverter. Since the inverter utilizes current feedback, its operating frequency is almost entirely dependent upon the design of the feedback transformer and the output current, which is maintained constant via control of the switching regulator. Consequently, the voltage applied across the inverter from the switching regulator has substantially no effect on its operating frequency and hence the latter remains virtually constant regardless of the load applied to the output of the inverter over its operating range.

To provide a substantially constant direct current from the square-wave output of the inverter, conventional rectification and filtering may be utilized.

In one embodiment, the switching regulator is controlled by sampling the input current of the inverter to provide a dc control voltage. Concurrently, the square-wave output of the inverter is used to drive a sawtooth voltage generator, the output of which is superimposed on the dc control voltage. This superimposed voltage is utilized to drive a switch so that variations in the dc control voltage alter its threshold point and hence the duty cycle thereof. This in turn is used to vary the ratio of "ON" to "OFF" times of the switching regulator in accordance with the load on the output of the converter. After filtering, the output of the regulator supplies a load dependent voltage to the inverter which results in a substantially constant output current from the latter. Additionally, because the inverter utilizes current as opposed to voltage feedback, its operating frequency remains substantially fixed.

BRIEF DESCRIPTION OF THE DRAWINGS

An example embodiment of the invention will now be described in conjunction with the accompanying drawings in which.

DESCRIPTION OF THE PREFERRED EMBODIMENT

Figure 1:
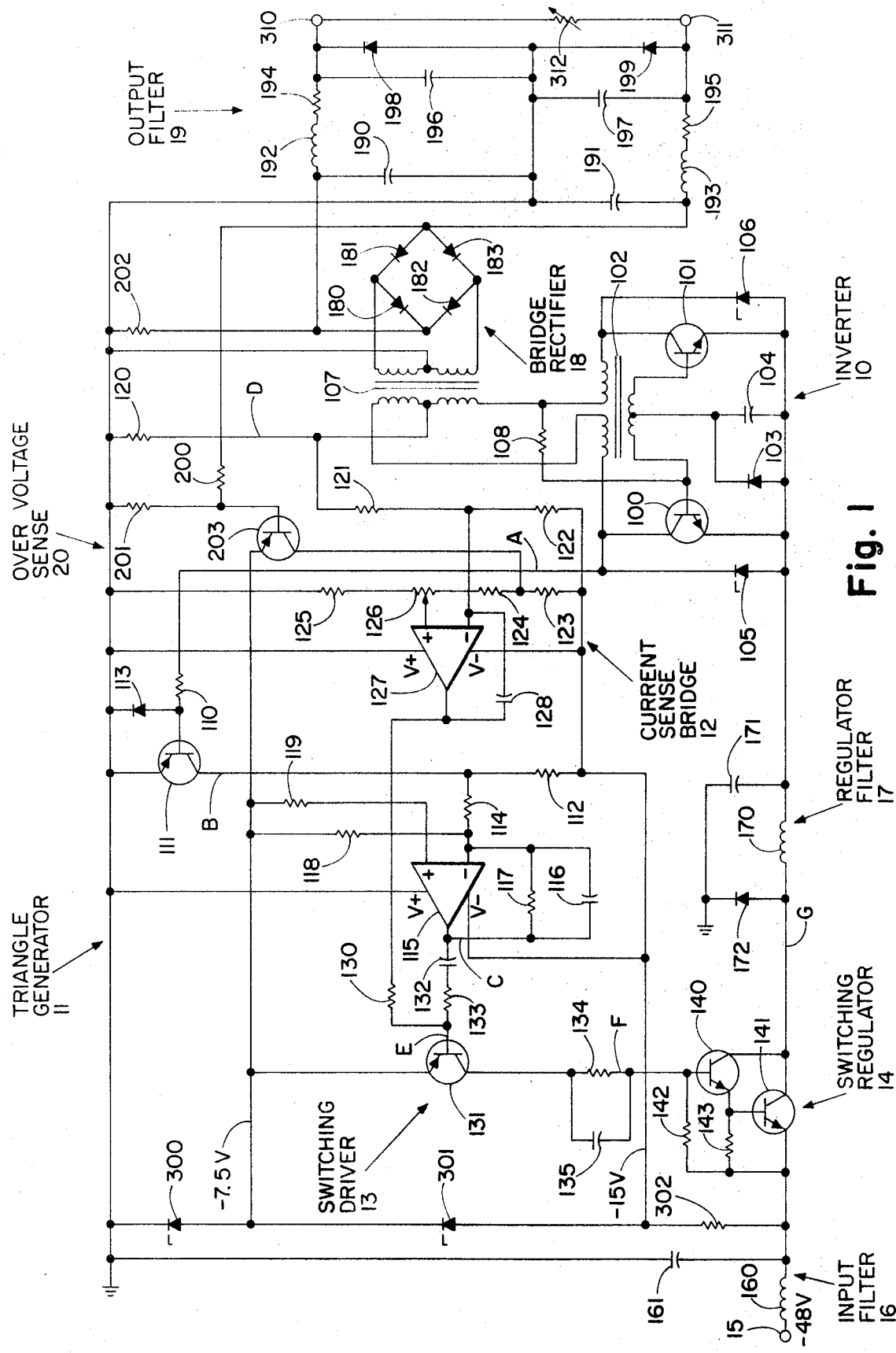
FIG. 1 is a block and schematic circuit diagram of a dc to dc converter in accordance with the present invention.
Figure 2:
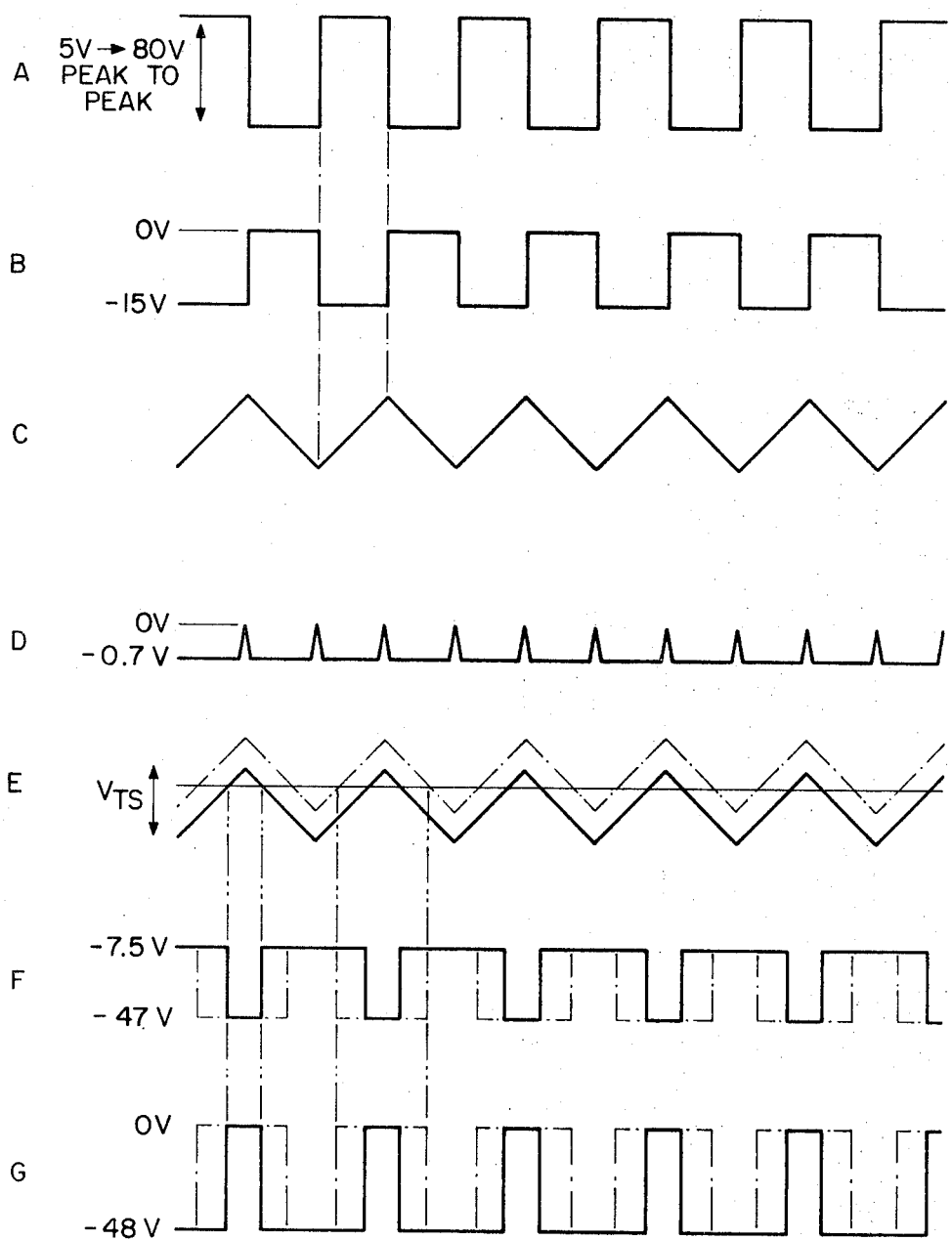
FIG. 2 illustrates typical voltage waveforms vs time at various operating points of the converter illustrated in FIG. 1.

In the following detailed description, each of the waveforms illustrated in FIG. 2 is identified by a reference character, the location of which is identified by a corresponding reference character in FIG. 1.

Referring to FIG. 1, the dc to dc converter basically comprises a push-pull two-transformer inverter 10 which utilizes current feedback. To regulate the inverter, its square-wave voltage output is fed to a triangle generator 11 which produces a sawtooth voltage at its output. In addition, current in the inverter 10 is sampled in a current sensitive bridge 12 to provide at its output a dc control voltage. The sawtooth voltage is superimposed on the dc control voltage and the resultant is fed to a switching driver 13 which produces at its output a switching voltage having a duty cycle that is inversely proportional to the output current of the inverter 10. This switching voltage is then utilized to control a switching regulator 14.

Input to the switching regulator 14 is obtained from a −48v supply voltage 15 which is coupled through an input filter 16. The output of the switching regulator 14 is connected through a regulator filter 17 to the input of the inverter 10. The output of the inverter 10 is connected to a bridge rectifier 18 and thence through an output filter 19 to provide a substantially constant direct current at its output over widely varying load conditions. In addition, an over-voltage sense 20 is provided to limit the overall output voltage of the converter if the load thereon should become open-circuited.

The detailed structure of the dc to dc converter will become readily apparent from the following combined description of its function and operation.

The free-running push-pull inverter 10 comprises a pair of transistors 100 and 101 connected in a push-pull configuration with their collectors each connected in series with a separate winding of a saturating driver transformer 102 to provide current feedback. The feedback portion of the inverter 10 comprises a center-tapped winding on the transformer 102 the ends of which are connected to the bases of the transistors 100 and 101. In addition, the shunt connected combination of a diode 103 and a capacitor 104 are connected to the center-tapped winding to provide a starting-up bias in a well known manner. Two Zener diodes 105 and 106 are utilized to limit the voltage applied across the transistors 100 and 101 respectively. A non-saturating output transformer 107 is effectively connected between the collectors of the transistors 100 and 101. The inverter 10 also includes a resistor 108 which is connected in a well known manner to provide a starting circuit for it.

The inverter 10 is supplied with a dc voltage between about 0 and −48v in accordance with the load applied to its output. This supply voltage is controlled in the following manner. Referring to both FIGS. 1 and 2, the square-wave output voltage A (which in this example embodiment varies between 5v and 80v peak to peak), is applied through a resistor 110 to the base of a transistor 111. The collector of the transistor 111 is connected through a load resistor 112 to a −15v reference voltage which is derived from two serially connected Zener diodes 300 and 301 and a resistor 302 which are connected across the filtered input of the −48v supply 15. The purpose of the transistor 111 is to provide a square-wvae of constant amplitude to the triangle generator 11. A diode 113 prevents positive-going excursions on the base of the transistor 111.

The square-wave output waveform B on the collector of the transistor 111 is applied through a resistor 114 to the inverting input of an operational amplifier 115. A Miller integrating network comprising a capacitor 116 and resistor 114 and 117 together with bias resistors 118 and 119 produce a sawtooth waveform C of substantially constant amplitude and frequency at the output of the triangle generator 11.

Concurrently, the input current of the inverter 10 is sampled by a small resistor 120 which is connected between the center tap of the primary of the output transformer 107 and ground. The inverter input current is directly proportional to the load current. The resistor 120, across which is derived voltage waveform D, forms part of the current sense bridge 12 which also comprises resistors 121, 122, 123, 124, 125 and potentiometer 126 arranged in a conventional bridge configuration between the −15v reference voltage and ground. The junction of the resistors 121 and 122, and the movable arm of the potentiometer 126 are connected to the inverting and non-inverting inputs respectively of an operational amplifier 127. A capacitor 128 provides smoothing so as to derive at its output a dc control voltage which is inversely proportional to the dc load current. The movable arm of the potentiometer 126 can be adjusted to provide the desired output current from the inverter.

The dc control voltage at the output of the operational amplifier 127 is dc coupled through a resistor 130 to the base of a transistor 131 in the switching driver 13. The sawtooth voltage C at the output of the operational amplifier 115 is ac coupled through a capacitor 132 and a resistor 133 also to the base of the transistor 131 to provide a superimposed voltage waveform E. Because the amplitude of the sawtooth voltage C is constant, at a constant operating frequency conduction of the switching transistor 31 is essentially controlled by the level of the dc control voltage $V_{TS}$ (transistor switching voltage) as illustrated in voltage waveform E of FIG. 2. The output of the switching transistor 131 is coupled through a resistor 134 and a capacitor 135 to provide a switching voltage waveform F which is applied to the switching regulator 14.

The switching regulator 14 is of a conventional configuration and comprises an input transistor 140, an output transistor 141 and two biasing resistors 142 and 143. As is apparent, the switching voltage waveform F swings between a reference voltage of −7.5v which is derived from the junction of the two Zener diodes 300 and 301 and approximately −47v which is derived from the base to emitter voltage drop across the two transistors 140 and 141. Its duty cycle is in turn controlled by the superimposed voltage waveform E which, as explained previously, is inversely proportional to the current across the sensing resistor 120.

The −48v input from the battery supply 15 is connected through the conventional LC input filter 16 comprising a series connected inductor 160 and a shunt connected capacitor 161. This input filter 16 prevents noise being fed back into the −48v battery supply 15.

The output of the switching regulator 14 is switched between 0 and −48v with a variable duty cycle as shown in voltage waveform G. This output is applied to a conventional LC regulator filter 17 which includes a series connected inductor 170 and a shunt connected capacitor 171. In addition, a diode 172 which is connected in shunt with the input of the filter 17 is used to prevent positive-going excursions of the switching regulator output voltage.

The variable dc supply voltage from the regulator filter 17 is applied across the free-running inverter 10. The output from the secondary of the output transformer 107 is applied to the bridge rectifier 18 which comprises diodes 180, 181, 182 and 183. The output of the bridge rectifier 18 is then applied to the balanced output filter 19 of $\pi$ configuration comprising input capacitors 190 and 191, series inductors 192 and 193, series resistors 194 and 195, and output capacitors 196 and 197. This results in an output voltage which is directly proportional to the input voltage to the inverter 10. Diodes 198 and 199 are connected to protect the inverter 10 from damaging voltages which may be induced in the transmission line.

The balanced dc output of the converter appears across output terminals 310 and 311 and provides a substantially constant current into a widely varying load 312 which may be connected thereacross. In a practical application the load might comprise a transmission line which would include a number of serially connected repeater amplifiers.

In order to limit the output voltage of the converter to ±135v when the load 312 is open-circuited, the output of the bridge rectifier 18 is also applied to a voltage divider comprising series resistors 200 and 201 in the over-voltage sense 20. To maintain balance across the bridge rectifier 18, the over-voltage sense 20 also includes a resistor 202. The junction of the two resistors 200 and 201 is connected to the base of a transistor 203, the emitter of which is connected to the −7.5v reference voltage. When the voltage between one side of the bridge rectifier 18 and ground exceeds 135v, the transistor 203 commences to conduct. The collector of the transistor 203 is connected to the junction of the resistors 123 and 124 in the current sensitive bridge 12 in such a manner as to alter the output of the operational amplifier 127. This in turn limits the duty cycle at the output of the switching regulator 14 and thereby limits the output voltage of the converter.

In a typical system installation for use in powering a transmission system, the dc to dc converter provides 100 mA constant current into any resistive load between 0 ohms and 2.4 Kohms from the −48v battery supply 15. The dc output voltage is balanced and limited to ±135v for safety considerations. The inverter is designed to operate at a nominal frequency of 17 KHz. Since the sawtooth voltage generator 11 is driven by the output of the inverter 10, the switching regulator 14 and the inverter 10 are frequency synchronized. By employing current feedback in the inverter 10, its operating frequency is essentially determined by the primary current and the core characteristics of the saturating feedback transformer 102. Hence, since the current is maintained constant through control of the switching regulator 14, the frequency of oscillation remains constant and independent of the varying dc supply voltage applied to the inverter 10.

What is claimed is:

1. A converter for generating a substantially constant current over widely varying load conditions, comprising:
   a free-running, two-transformer inverter utilizing current feedback;
   means, response to the free-running, two-transformer inverter, for generating a frequency synchronized switching voltage having a duty cycle which is proportional to the output current from said inverter;
   a switching regulator, responsive to the switching voltage for switching a supply voltage; and
   means for filtering the switched supply voltage to provide a variable dc supply voltage to said inverter which tends to oppose changes in the output current thereof;
   whereby the output current and the frequency of the inverter remain substantially constant over widely varying load conditions.

2. A dc to dc converter, for generating a substantially constant current over widely varying load conditions, comprising:
   a free-running, two-transformer push-pull inverter having a saturating driver transformer utilizing current feedback, and a non-saturating output transformer;
   means for generating a dc control voltage which varies in proportion to the current in said non-saturating output transformer;
   means responsive to the switched output voltage of said two-transformer push-pull inverter, for generating a sawtooth voltage of substantially constant amplitude;
   drive circuit means, responsive to the sawtooth voltage superimposed on said dc control voltage, for generating a switching voltage having a variable duty cycle;
   a switching regulator, responsive to said switching voltage, for switching a supply voltage;
   means for filtering the switched supply voltage to provide a variable dc supply voltage to said inverter which opposes changes in the output current of the non-saturating output transformer; and
   means for rectifying and filtering the output of said non-saturating output transformer to provide a substantially constant direct current output over widely varying load conditions;
   whereby the frequency of the inverter also remains substantially constant over said conditions.

3. A dc to dc converter as defined in claim 2 in which the drive circuit means comprises:
   a switching transistor in which the sawtooth voltage is ac coupled and the dc control voltage is dc coupled thereto, so that a change in the level of the dc control voltage alters the portion of the sawtooth voltage which causes the switching transistor to conduct, thereby altering said duty cycle.

4. A dc to dc converter as defined in claim 2 in which the means for generating a dc control voltage comprises:
   a resistive bridge in which one pair of opposed ends is connected across a source of reference voltage and the other pair of opposed ends is connected to the inputs of a differential amplifier, and the current in said non-saturating output transformer is introduced across one arm of said bridge.

5. A dc to dc converter as defined in claim 4 which additionally includes an over-voltage limiter comprising:
   means for generating an over-voltage control signal when the dc output voltage exceeds a predetermined value; and
   means for introducing said over-voltage control signal to the arm of said bridge opposed said one arm.

6. A converter for generating a substantially constant current over widely varying load conditions, comprising:
   a free-running inverter utilizing current feedback;
   switching regulator means, responsive to the output current from the free-running inverter, for switching a supply voltage so that the duty cycle thereof opposes changes in the output current of said free-running inverter; and
   means for filtering the switched supply voltage to provide a variable dc supply voltage to said inverter;
   whereby the output current and the frequency of the inverter remain substantially constant over widely varying load conditions.

* * * * *